United States Patent [19]
Koshikawa

[11] 4,084,148
[45] Apr. 11, 1978

[54] OBJECT RECOGNITION SYSTEM

[75] Inventor: Tsuneji Koshikawa, Sayama, Japan

[73] Assignee: Hitachi, Ltd., Japan

[21] Appl. No.: 730,529

[22] Filed: Oct. 7, 1976

[30] Foreign Application Priority Data

Oct. 13, 1975 Japan .............................. 50-122524
Mar. 3, 1976 Japan .............................. 51-22101

[51] Int. Cl.² .............................................. G01S 9/66
[52] U.S. Cl. ............................ 340/1 R; 340/3 R; 340/5 MP
[58] Field of Search ............... 343/5 SA, 100 CL; 340/3 R, 1 R, 5 MP

[56] References Cited

U.S. PATENT DOCUMENTS

3,787,849  1/1974  Sletten et al. .................. 343/100 CL
3,952,280  4/1976  Altes ..................................... 340/3 R Primary Examiner—Richard A. Farley
Attorney, Agent, or Firm—Craig & Antonelli

[57] ABSTRACT

An object recognition system wherein, in order to derive the features of an object to-be-recognized such as shape and size from a reflected wave or echo, the ratio between a signal obtained by Fourier transforming a part of a transmitting wave for the object and a signal obtained by Fourier transforming a received reflecting wave is subjected to the inverse Fourier transform so as to obtain separate reflection signals corresponding to a large number of reflecting points of the object, whereby the features of the object are recognized by utilizing the reflection signals.

3 Claims, 5 Drawing Figures

OBJECT RECOGNITION SYSTEM

BACKGROUND OF THE INVENTION (1) Field of the Invention

This invention relates to an object recognition system, and more particularly to a system in which, as in a sonar, the features of an object such as size and shape are grasped from a reflected wave or echo from the object so as to recognize the object.

(2) Description of the Prior Art

In conventional object recognition systems such as sonar, it has been mainly aimed at to detect an object, i.e., to know the presence of an object. Since the recognition of an object has mostly relied on hearing by a sonar operator, etc., a satisfactory recognition performance has not been attained, and many attempts for recognizing the feature of object automatically have not been made.

Mentioned as a reason for the unsatisfactory recognition performance is that conventional signal processing systems, etc., are deemed to be suitable chiefly for the detection of a signal and that careful consideration is not always given to the adaptation for the recognition of an object.

Simultaneously, complicated and diverse properties ascribable to, for example, the multiple reflections of an object, i.e., reflections at many points on an object are considered a major reason for the difficult recognition of an object.

SUMMARY OF THE INVENTION

The principal object of this invention is to realize an object recognition system which can automatically detect, not only the presence of an object, but also the features thereof such as size and shape.

In order to accomplish the object, this invention automatically analyzes and recognizes the features of an object by exploiting a nature peculiar to a reflected wave as based on the fact that the times at which ultrasonic signals are reflected from the object are different.

According to one aspect of this invention, there is provided an object recognition system wherein the characteristics of the shape of an object are derived from a reflected wave from the object at the impingement of a radiation wave so as to recognize the object, characterized by Fourier transforming a transmitting wave for the object, Fourier transforming a reflected wave from the object, and obtaining the inverse Fourier transform of the ratio between the results of the two Fourier transforms, thereby to acquire characteristic patterns corresponding to many reflecting points of the object.

Other objects and features of this invention will become apparent from the following description of embodiments taken with reference to the drawings.

DETAILED DESCRIPTION OF THE INVENTION

Prior to the description of the embodiments of this invention, the principle of this invention will be analytically explained in order to facilitate understanding of the operations and constructions of the embodiments.

Now, let $f(t)$ denote a transmitting wave and $g(t)$ denote a received wave from an object ($t$ represents time). When the object is large and has a large number of reflecting positions, Nos. of the respective reflecting points are represented by $i$ ($i = 1, 2, \ldots n$) and reflected waves from the respective reflecting points by $e_i(t)$. Supposing that the respective reflecting points are independent, $e_i(t)$ is generally given by:

$$e_i(t) = a_i(t - \tau_i) \cdot f(t - \tau_i) \tag{1}$$

where $a_i$ denotes the amplitude envelope of each reflected wave, and $\tau_i$ ($i = 1, 2, \ldots n$) the period of time required for each reflected wave to emerge at a receiving point, i.e., the time delay with respect to the transmitting wave $f(t)$.

The reflected waves $g(t)$ from the object become as follows as the composition of the reflected waves from the various reflecting points on the object:

$$g(t) = \sum_{i=1}^{n} a_i(t - \tau_i) \cdot f(t - \tau_i) \tag{2}$$

Here, assuming that the duration time of the transmitting wave is sufficiently small, $a_i(t - \tau_i)$ can be approximated by a constant value $A_{io}$ independent of the time in correspondence with each reflecting point ($i = 1, 2, \ldots n$).

Accordingly, Eq. (2) can be approximated by:

$$g(t) = \sum_{i=1}^{n} A_{io} \cdot f(t - \tau_i) \tag{3}$$

Thus, letting $G(\omega)$ denote the Fourier transform of the received wave $g(t)$ and $F(\omega)$ the Fourier transform of the transmitting wave $f(t)$ ($\omega$ represents the angular frequency), $$G(\omega) = \int_{-\infty}^{\infty} \sum_{i=1}^{n} A_{10} \cdot f(t - \tau_i) \exp(-j\omega t) dt \tag{4}$$

$$= F(\omega) \sum_{i=1}^{n} A_{io} \exp(-j\omega \tau_i)$$

Here, letting $R(\omega)$ denote the ratio between the frequency spectra of the transmitting wave and the received wave, or the so-called input/output response, $$R(\omega) = \frac{G(\omega)}{F(\omega)} = \sum_{i=1}^{n} A_{io} \exp(-j\omega \tau_i) \tag{5}$$

Further, letting $r(t)$ denote the inverse Fourier transform of $R(\omega)$, $$r(t) = \frac{1}{2\pi} \int_{-\infty}^{\infty} \sum_{i=1}^{n} A_{io} \exp(-j\omega \tau_i) \cdot \exp(j\omega t) d\omega \tag{6}$$

$$= \sum_{i=1}^{n} A_{io}\delta(t - \tau_i)$$

where $\delta$ denotes the so-called Dirac's delta function. From the above equation, when the inverse Fourier transform of the ratio between the respective frequency spectra of the transmitting wave towards the object and the reflected waves from the object is taken, the processed output can be derived as the time serial train of pulse waves of amplitudes $a_{io}(i = 1, 2, \ldots n)$. Accordingly, the reflecting points on the object are separated in time, and patterns corresponding to the features of the shape of the object can be obtained.

In the above, description has been made of a case where the object is stationary. It will now be explained that the principle is similarly applicable to a case where the object is moving.

Let C denote the propagation velocity of the acoustic wave in a transmitting medium, $V_S$ the component of the moving velocity of a transmitting and receiving point (for example, an observation ship), and $V_T$ the component of the moving velocity of the object at the transmission as taken in the propagation direction of the acoustic wave. Here, the sign of the velocity component $V_S$ or $V_T$ shall be positive when the propagation direction of the acoustic wave and the direction of the moving velocity component of the ship or the object are identical.

Accordingly, the propagation direction of the transmitting wave and that of the received wave or the reflected wave from the object are opposite to each other. Therefore, letting $V_S'$ and $V_T'$ denote the moving velocity components of the ship and the object at the receiving time, respectively, the following relations hold by considering that the velocity changes of the ship and the object during the period of the transmission and reception are sufficiently small:

$$V_S' = -V_S$$

$$V_T' = -V_T$$

In case where the ship and the object move at the above velocities, respectively, the Doppler shift arises in the signal frequency as is well known. That is, letting $\nu_s$ denote the frequency of the transmitting signal, $\nu_e$ the frequency of the received signal, and D the Doppler coefficient, the value D is generally given by the following equation:

$$D = \frac{\nu_s}{\nu_e} = \frac{C - (V_S - V_T)}{C - (V_T - V_S)} \quad (7)$$

Likewise, as to the case where both the ship being the signal transmitting and receiving point and the target object are moving, let $\tau_i (i = 1, 2, \ldots n)$ denote the time delay of each reflected wave relative to the transmitting wave and $r_i (i = 1, 2, \ldots n)$ denote the distance between the ship and each of many reflecting points of the target object. Then, the following relation holds:

$$\tau_i = \frac{2 r_i}{C - (V_T - V_S)} \quad (i = 1, 2, \ldots n) \quad (8)$$

From the above relation, the reflected wave $e_i(t)$ from each reflecting point of the object at the time when both the ship and the object are moving can be generally indicated as follows:

$$e_i(t) = a_i(Dt - \tau_i) \cdot f(Dt - \tau_i)$$

where $a_i$ is the time function of the amplitude envelope of each reflected wave.

Thus, the entire reflected wave $g(t)$ from the object can be given as follows as the composition of the reflected waves $e_i (i = 1, 2, \ldots n)$ from the respective reflecting points on the target object:

$$g(t) = \sum_{i=1}^{n} e_i(t) \quad (9)$$

$$= \sum_{i=1}^{n} a_i(Dt - \tau_i) \cdot f(Dt - \tau_i)$$

Assuming here that the duration time of the transmitting wave is sufficiently small, the amplitude envelope $a_i(Dt - \tau_i)$ of the reflected wave $e_i$ from each reflecting point can be approximated by a constant value $A_{io} (i = 1, 2, \ldots n)$ independent of the time in correspondence with each reflecting point.

Accordingly, the received wave $g(t)$ can be further represented by:

$$g(t) = \sum_{i=1}^{n} A_{io} \cdot f(Dt - \tau_i) \quad (10)$$

Thus, letting $G(j\omega)$ denote the Fourier transform of the received wave $g(t)$ and $F(j\omega)$ the Fourier transform of the transmitting wave $f(t)$ ($\omega$ represents the angular frequency), $G(j\omega)$ becomes:

$$G(j) = \int_{-\infty}^{\infty} \sum_{i=1}^{n} A_{io} \cdot f(Dt - \tau_i) \exp(-j\omega t) \, dt \quad (11)$$

$$= \frac{1}{D} F\left(\frac{j\omega}{D}\right) \sum_{i=1}^{n} A_{io} \cdot \exp\left(-j\omega \frac{\tau_i}{D}\right)$$

Here, $(1/D)F(j\omega/D)$ is the Fourier transform of a signal $f(Dt)$, i.e., a signal whose time scale is elongated (at $D > 1$) or compressed (at $D < 1$) by the Doppler coefficient D with respect to the transmitting signal $f(t)$. Hereunder, the above $(1/D)F(j\omega/D)$ will be expressed by $F'(j\omega)$.

When $D = 1$ and accordingly the relative velocity between the ship and the target object is zero, $F'(j\omega)$ agrees with the Fourier transform $F(j\omega)$ of the transmitting signal.

Letting now $R(j\omega)$ denote the ratio between the Fourier transform of the signal $f(Dt)$, accordingly the frequency spectrum $F'(j\omega)$ and the frequency spectrum $G(j\omega)$ of the received wave, $$R(j\omega) = \frac{G(j\omega)}{F'(j\omega)} = \sum_{i=1}^{n} A_{io} \exp\left(-j\omega \frac{\tau_i}{D}\right) \quad (12)$$

Further, letting $r(t)$ denote the inverse Fourier transform of $R(j)$, $$r(t) = \frac{1}{2\pi} \int_{-\infty}^{\infty} \sum_{i=1}^{n} A_{io} \exp\left(-j\omega \frac{\tau_i}{D}\right) \cdot \exp(j\omega t) d\omega \quad (13)$$

$$= \sum_{i=1}^{n} A_{io} \delta\left(t - \frac{\tau_i}{D}\right)$$

Here, δ is the so-called Dirac's delta function. From the above equation, when the inverse Fourier transform of the ratio between the respective frequency spectra of the wave $f(Dt)$ obtained by multiplying the time scale of the transmitting wave by the Doppler coefficient D and the reflected wave $g(t)$ from the target is taken, the processed output can be derived as the time serial signals of pulse waves of the amplitudes $A_{io}$ and the times of emergence $\tau_i/D$ ($i = 1, 2, \ldots n$). As the result of the foregoing, the reflecting points on the target object are separated in distances according to the times, and patterns corresponding to the features of the shape of the object can be obtained.

Figure 1:
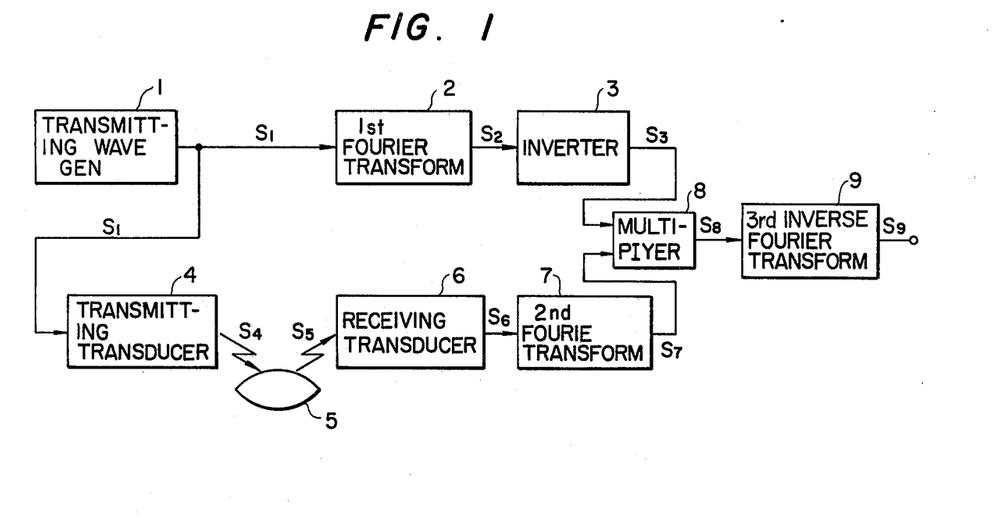
FIG. 1 is a block diagram which shows the construction of an embodiment of the object recognition system according to this invention.
Figure 2:
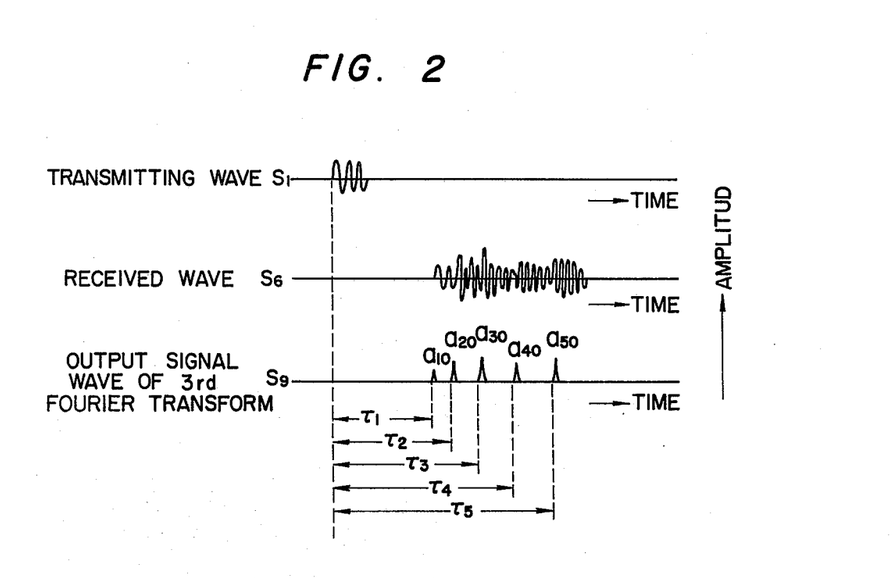
FIG. 2 is a waveform diagram for explaining the operation of the embodiment.

FIG. 1 illustrates the whole construction of an embodiment of the object recognition system to which this invention is applied. FIG. 2 is a waveform diagram for elucidating the operation of the embodiment in FIG. 1.

First, a transmitting signal $S_1$ is generated by a transmitting wave generator 1. The signal $S_1$ corresponds to the foregoing $f(t)$. Usually, it is a sinusoidal wave of very short duration time or the so-called pulsed continuous wave as shown $S_1$ in FIG. 2. It is periodically generated at long time intervals. For the sake of convenience of the explanation, however, a single waveform will be referred to.

A part of the signal $S_1$ is applied to a transmitting transducer 4 and is converted into an ultrasonic wave signal $S_4$, which is directed towards a target object 5 lying, for example, under water. A reflected wave $S_5$ from the object 5 is caught by a receiving transducer 6 and is converted into an electric signal $S_6$. The signal $S_6$ corresponds to the foregoing $g(t)$. As shown at $S_6$ in FIG. 2, it has a complicated waveform different from the transmitting waveform. This is because the target object has an extent in the direction of radiation of the ultrasonic wave signal $S_4$ and accordingly signals reflected at many points of the object are superposed into the signal $S_6$. It is impossible to separate the many reflecting points and recognize the shape of the object directly from such signal $S_6$.

In the present embodiment according to this invention, the signal $S_6$ is Fourier transformed by a first Fourier transform device 7 and is once converted into a frequency spectrum signal $S_7$. The signal $S_7$ corresponds to the foregoing $G(\omega)$, and the Fourier transform device 7 conducts the operation of the foregoing equation (4).

On the other hand, the other part of the transmitting signal $S_1$ is applied to a second Fourier transform device 2 and is converted into a frequency spectrum signal $S_2$ by the Fourier transform. The signal $S_2$ corresponds to the foregoing $F(\omega)$. The frequency spectrum signal $S_2$ is converted by an inverter 3 into a spectrum signal $S_3$ which corresponds to $1/F(\omega)$.

The two Fourier-transformed frequency spectrum signals $S_3$ and $S_7$ are applied to a multiplier 8, to obtain a signal $S_8$ which corresponds to the foregoing input-/output response $R(\omega) = G(\omega)/F(\omega)$. It indicates the incident wave — versus — reflected wave characteristic, in other words, the frequency transfer characteristic of the target object. The multiplier 8 performs the operation of the foregoing equation (5).

The output signal $S_8$ of the multiplier 8 is further applied to a third Fourier transform device 9 and converted into a signal $S_9$ on a time scale. That is, the third Fourier transform device 9 carries out the operation of the foregoing equation (6), and the output signal $S_9$ corresponds to the foregoing $r(t)$.

As shown at $S_9$ in FIG. 2, the inverse Fourier transformed signal being the output of the third Fourier transform device has the respective reflecting points of the object separated on the time axis as a train of pulses of amplitudes $A_{io}$ ($i = 1, 2, \ldots n$), the reflecting points having been inseparable in the output wave $S_6$ of the receiving transducer 6. Accordingly, the characteristic shape of the target object can be revealed by indicating the signal $S_9$ on a known display device such as a cathode ray tube (CRT) or an oscilloscope.

Since the constructions of all the blocks themselves constituting the embodiment are well known to those in the art, the details are omitted. The Fourier transform device is described in, for example, G. D. Bergland "Fast Fourier Transform Hardware implementations — A — Survey," IEEE Trans. Vol Au-17, No. 2 (1969), p. 109.

The above embodiment is applicable in case where the target object is stationary. It is used in, for example, means for analyzing reflecting sound fields in a room, means for processing earthquake waves or prospecting waves, etc., in addition to the sonar signal processing.

Description will now be made of an embodiment which is applicable to a case where a target object moves.

Figure 3:
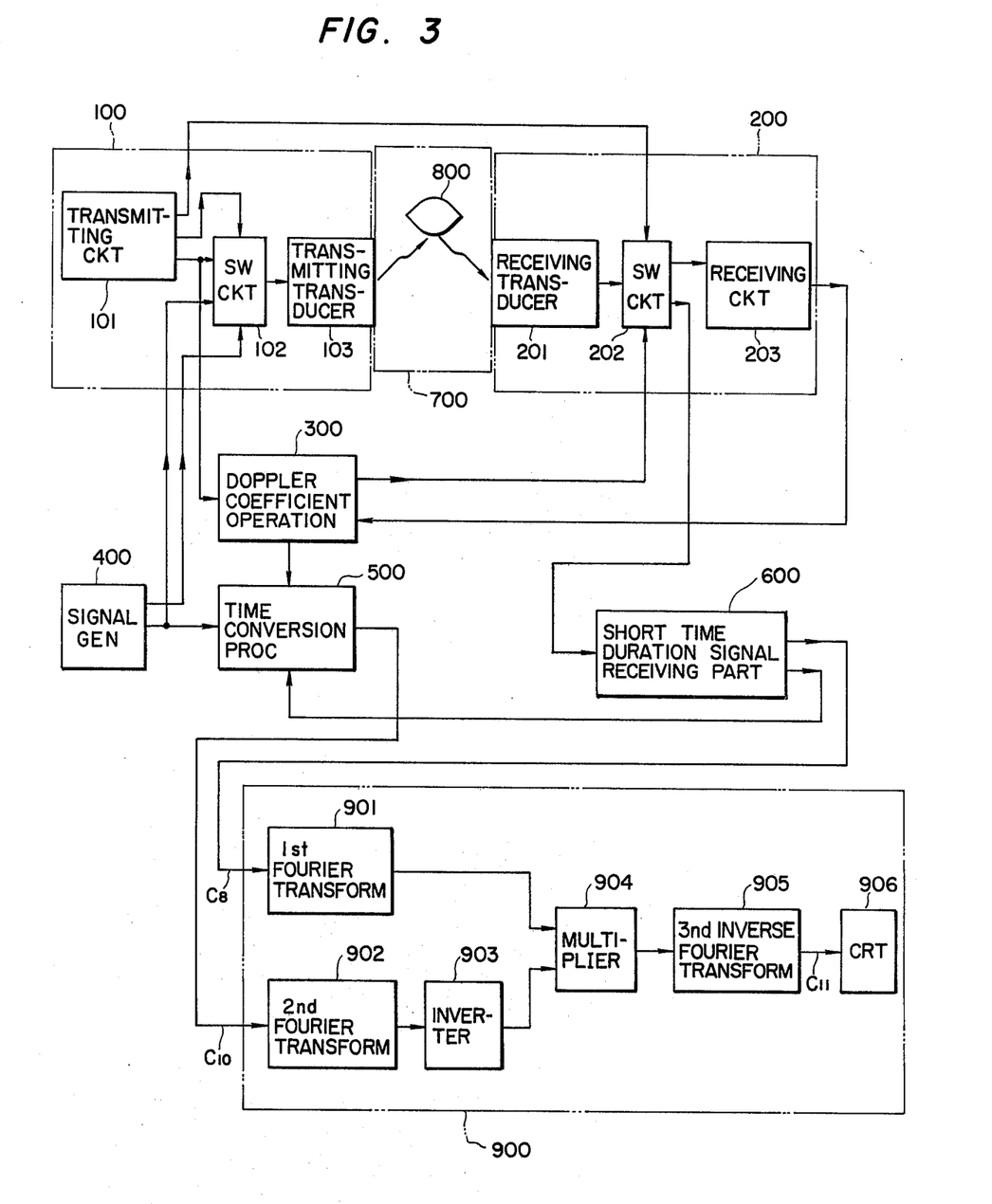
FIG. 3 is a block diagram which shows the construction of another embodiment of the object recognition system of this invention.
Figure 4:
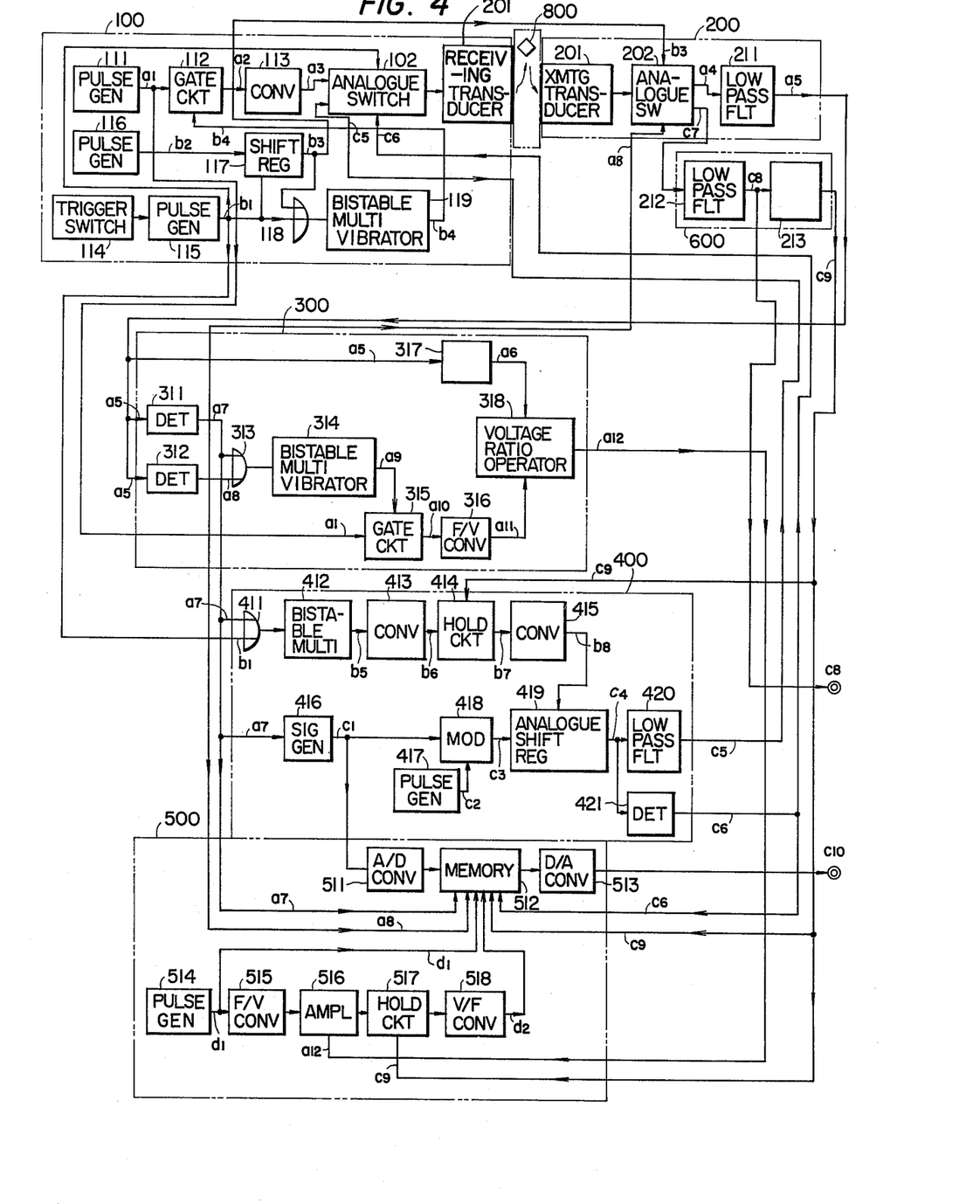
FIG. 4 is a block diagram which shows the detailed construction of the embodiment shown in FIG. 3.
Figure 5:
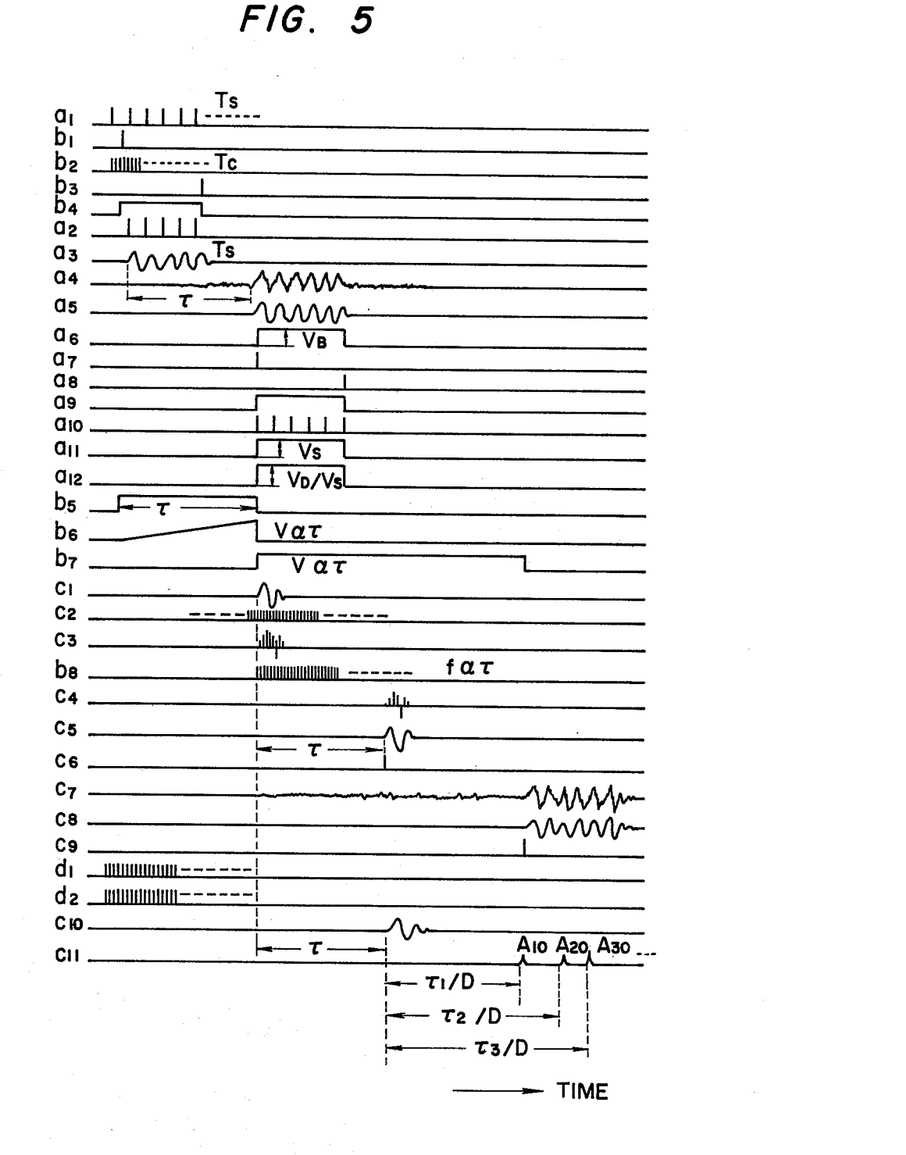
FIG. 5 is a waveform diagram for explaining the operation of the embodiment shown in FIG. 3.

FIG. 3 shows the construction of another embodiment of the object recognition system according to this invention, FIG. 4 is a diagram showing the detailed construction of the embodiment, and FIG. 5 is a waveform diagram for explaining the operation of the embodiment. The present embodiment is constructed on the basis of the foregoing principle given in Eqs. (7) - (13). Since the Fourier transform processing parts are substantially the same as in the case illustrated in FIG. 1, the details of them are omitted.

To the end of measuring the Doppler coefficient D previously stated, a sinusoidal wave whose duration time is sufficiently long for the Doppler measurement, i.e., the so-called long pulsed continuous wave (hereinbelow, abbreviated to LPCW) is generated from a transmitting circuit 101 of a transmitting part 100. The LPCW is supplied through a switch 102 to a transmitting transducer 103. An acoustic wave emitted from the transmitting transducer 103 into a transmission medium 700 such as water comes into incidence on a target object 800. A reflected wave from the object as consequently occurs is received by a receiving transducer 201, and is supplied through a switch 202 to a receiving circuit 203.

The transmitting signal from the transmitting circuit 101 and an output signal of the receiving circuit 203 are applied to a Doppler coefficient operation part. Thus, a signal which has an amplitude value corresponding to the value D of the Doppler coefficient is obtained as an output of the operation part 300. That is, the amplitude value of the signal is so set as to become 1 when the Doppler coefficient D is 1.

After the quantity of the Doppler effect due to the target object has been measured in advance as stated above, a transmitting signal of sufficiently short duration for the recognition of the target object is generated from a signal generator part 400 and is supplied through the switch 102 to the transmitting transducer 103. Simultaneously therewith, the transmitting signal is supplied to a time conversion processing part 500.

In the time conversion processing part 500, the time axis of the short duration time signal is expanded or compressed according to the magnitude of the Dopper effect by the use of the Doppler coefficient D evaluated above. Thus, a signal which is equivalent to the transmitting signal endowed with the Doppler effect is obtained as a transmitting signal for processing the object recognition to be stated later.

On the other hand, the short duration time transmitting signal supplied to the transmitting transducer 103 is radiated as an acoustic wave from the transducer 103 into the medium and comes into incidence on the object again. A reflected wave consequently arising is caught by the receiving transducer 201 and is applied through the switch 202 to a short duration time signal receiving part 600. As the result, a received signal for the object recognition processing is obtained as an output of the receiving part 600.

Subsequently, the two signals thus obtained, i.e., the transmitting signal for the object recognition processing (time conversion processing signal) and the received signal for the same are respectively supplied to an object feature pattern deriving and displaying part 900.

In the deriving and displaying part, the received signal stated above is subjected to the Fourier transform by a Fourier transform unit 901, the time conversion transmitting signal stated above is subjected to the Fourier transform by a Fourier transform unit 902 and is further subjected to the inverse number operation by an inverter 903, and the multiplication between the result of the first-mentioned Fourier transform and the result of the inverse number operation is conducted by a multiplier 904. An output of the multiplier 904 is subjected to the inverse Fourier transform by an inverse Fourier transform unit 905. An output of the unit 905 is indicated on a screen of a display tube 906. Thus, a pattern which corresponds to the multiple reflecting point structure of the target object is obtained. In this way, the recognition of the object 800 can be executed.

Now, the portion for measuring the Doppler coefficient and automatically converting the time axis of the transmitting signal on the basis of the result of the measurement will be described more in detail with reference to FIGS. 4 and 5.

FIG. 4 is a diagram showing the circuit arrangement of the portion, while FIG. 5 is a time chart of the waveforms of signals at various parts of the circuit. In FIG. 4, the same numerals as in FIG. 3 designate the corresponding parts. Roman letters indicative of the waveforms in FIG. 5 signify waveforms at parts of the same Roman letters given in FIG. 2.

A pulse train $a_1$ which has a repetition period $T_s$ for the Doppler measurement is generated from a pulse generator 111 of the long duration time transmitting signal (LPCW) generating part 100. The pulse train is impressed on a gate circuit 112. On the other hand, a single pulse $b_1$ is generated from a pulse generator 115 by a trigger switch circuit 114. The pulse $b_1$ serves to start the operations of subsequent various circuits. The start pulse $b_1$ is impressed on a shift register 117, while clock pulses $b_2$ having a period $T_c$ are impressed as the shifting clock of the shift register 117 from a pulse generator 116. Assuming the number of stages of the shift register 117 to be $n$, the input pulse $b_1$ is derived as an output pulse $b_3$ with a time delay $T = n\ T_c$ at the output of the shift register 117.

The pulse waves $b_3$ and $b_1$ are applied via an OR circuit 118 to a bistable multivibrator (hereinbelow, abbreviated to BMV) 119, from which an output wave $b_4$ is provided. The output wave $b_4$ is applied to the gate circuit 112 as a gating signal, and pulse waves $a_2$ having a duration T and a period $T_s$ are provided.

The pulse waves $a_2$ are converted by a pulse/sinusoidal wave converter 113 into a sinusoidal wave signal $a_3$ having the duration T and the period $T_s$, which is applied to an analog switch 102. On the other hand, the analog switch 102 receives the foregoing start pulse $b_1$ as a switching signal thereof, whereby the sinusoidal wave signal $a_3$ passes through the analog switch 102 and is applied to the transmitting transducer 103.

The transmitting output of the transmitting transducer 103 is radiated as the acoustic wave into the transmission medium 700 and comes into incidence on the target object 800. Subsequently, the reflected wave from the object 800 is caught by the receiving transducer 201 and is sent to the analog switch 202. The analog switch 202 is switched by the output pulse $b_3$ of the shift register 117, to provide a received wave $a_4$. Further, the received wave $a_4$ is passed through a low-pass filter 211 so as to obtain a received wave $a_5$ free from spurious noises.

Subsequently, the received wave $a_5$ is sent to the Doppler measurement circuit 300 and supplied to a frequency/voltage converter 317. It is converted into a voltage value $V_D$ corresponding to a repetition frequency $1/T_D$ of the received wave $a_5$ subjected to the Doppler shift, and is derived as a voltage waveform $a_6$ having the voltage value $V_D$.

On the other hand, the pulse waves for the transmitting signal $a_1$ before undergoing the Doppler shift due to the object are applied to a gate circuit 315. A rise pulse $a_7$ and a fall pulse $a_8$ of the received wave $a_5$ as are respectively obtained by a rise detecting circuit 311 and a fall detecting circuit 312 are applied through an OR circuit 313 to a BMV 314. Thus, a gating signal $a_9$ for a gate circuit 315 is provided as an output of the BMV 314. Gate output waves $a_{10}$ for the transmitting signal pulse waves $a_1$ are obtained by the gate signal $a_9$. The gate output waves $a_{10}$ are converted by a frequency/voltage converter 316 into a voltage value $V_s$ corresponding to a repetition frequency $1/T_s$ of the transmitting signal pulse waves $a_1$, and a voltage waveform $a_{11}$ having the voltage $V_s$ is obtained.

Subsequently, the voltage waveforms $a_6$ and $a_{11}$ are supplied to a voltage ratio operating circuit 318, which provides as its output a voltage waveform $a_{12}$ having an amplitude value corresponding to a voltage ratio $V_D/V_S$. That is, the voltage waveform $a_{12}$ have a value corresponding to the Doppler coefficient.

In the short duration time signal generating part 400, a short duration time signal generator 416 is started by the rise detection pulse $a_7$ of the received signal $a_5$ and produces a short duration time transmitting signal wave $c_1$ as its output. Sampling pulses $c_2$ are supplied from a pulse generator 417 to a pulse amplitude modulator 418. As the result, the signal wave $c_1$ is modulated by the pulse amplitude modulator 418, and a pulse amplitude modulated wave $c_3$ is obtained. Further, the pulse amplitude modulated wave is applied to an analog shift register 419.

The analog shift register 419 serves to bestow on the input wave $c_3$ a time delay equal to the transmission time $\tau$ of the acoustic wave during which the acoustic wave given forth from the transmitting transducer into the medium comes into incidence on the target object and then the reflected wave from the object arrives at the receiving transducer. This function is effected in a way stated hereunder.

In order to set the time interval between the time of the pulse wave $b_1$ for giving the transmitting signal pulse waves $a_1$ the start time thereof and the time of the rise detection pulse $a_7$ for giving the rise point of the received signal $a_5$, that is, the time interval equal to the propagation period $\tau$ of the acoustic wave in the medium 700 from the wave transmission to the wave reception, the waves $b_1$ and $a_7$ are applied through an OR circuit 411 to a BMV 412 so as to obtain a wave $b_5$ having a duration $\tau$ equal to the foregoing time interval as the output of the BMV. Subsequently, the duration $\tau$ of the wave $b_5$ is converted into a varying voltage value by a duration/voltage converter 413. Further, the final voltage value is held by a holding circuit 414, and a wave $b_7$ which sustains this voltage value is provided, as the output of the holding circuit.

Subsequently, the voltage value of the wave $b_7$ is converted into a corresponding frequency by a voltage/frequency converter 415 so as to obtain pulse waves $b_8$ whose recurrence frequency is equal to the converted frequency. The pulse waves $b_8$ thus obtained are supplied to an analog shift register 419 as clock pulses thereof.

Letting $f_c$ denote the recurrence frequency of the pulse waves $b_8$, i.e., the clock frequency of the clock pulses, and $m$ denote the number of shift stages of the analog shift register, the value $f_c$ is set as follows:

$\tau = m/f_c$

As the result, the aforecited pulse amplitude modulated wave $c_3$ having passed through the analog shift register 419 is endowed with the time delay of the length $\tau$ and is obtained as an output $c_4$ of the analog shift register.

The output waves $c_4$ are passed through a low-pass filter 420 which has a cut-off frequency of a value equal to substantially one-half of the recurrence frequency of sampling pulses generated from the pulse generator 417, i.e., the sampling frequency. Thus, an analog wave $c_5$ is obtained. The analog wave $c_5$ is supplied to the analog switch 102 as the transmitting signal for object recognition. The rise time of the analog wave $c_5$ detected by a rise detector 421, and the analog switch 102 is switched by an output pulse $c_6$ of the detector. Thus, the analog wave $c_5$ is applied via the analog switch 102 to the transmitting transducer 103.

An acoustic wave for the object recognition is radiated from the transmitting transducer 103 into the medium 700, and is caused to strike the target object 800. A reflected wave from the object 800 arising as a consequence is caught by the receiving transducer 201. An output of the receiving transducer 201 is further applied to the analog switch 202. On the other hand, the pulse wave $a_8$ arising at the fall time of the received wave $a_5$ of the LPCW is given to the analog switch 202 as a switching signal. As the result, the analog switch 202 is switched at the time of emergence of the pulse wave $a_8$, and the received wave for the object recognition passes through the analog switch and is derived as an output wave $c_7$.

Further, the output wave $c_7$ is passed through a low-pass filter 212, thereby to obtain an echo signal for the object recognition $c_8$ free from spurious noises.

Description will now be made of the time axis conversion processing part 500. The processing part performs for the object recognition processing, a time axis conversion processing for obtaining the transmitting signal wave in which the short duration time transmitting signal $c_5$ has its time axis converted so as to give the same Doppler shift as undergone by the received wave from the target object.

To this end, the output wave $c_1$ of the short duration time signal generator 416 is converted by an A/D converter 511 into a digital signal, which is recorded in a memory 512. Writing clock pulses $d_1$ for determining the writing speed at the recording are supplied to the memory 512 from a pulse generator 514. The initiation of the recording for the memory is controlled by the pulse wave $a_7$ which arises at the rise time of the long duration time received signal wave $a_5$. The termination of the recording for the memory 512 is controlled by the pulse wave $a_8$ which arises at the fall time of the long duration time received signal wave $a_5$. The above signal written in the memory 512 begins to be read out by the pulse wave $c_6$ which arises at the rise time of the short duration time transmitting signal wave $c_4$. A clock frequency at the read-out is given as stated below. The recurrence frequency of the output pulses $d_1$ of the pulse generator 514 is converted into a voltage by a frequency/voltage converter 515. Subsequently, the gain of an amplifier 516 is controlled by the voltage wave $a_{12}$ which has the amplitude value corresponding to the Doppler coefficient D measured beforehand, and the converted voltage is derived as a voltage value corresponding to the Doppler coefficient D. The voltage value is applied to a holding circuit 517, and is derived as an output of the holding circuit 517 after being held till the time of emergence of a pulse wave $c_9$ which arises at the rise time of the short duration time echo signal $c_8$. Subsequently, the voltage value thus held is converted into a corresponding frequency by a voltage/frequency converter 518 and is derived as pulse waves having a recurrence frequency equal to the converted frequency. The pulse waves are supplied to the memory 512 as read-out clock pulses thereof. When, in the above operation, the clock frequency of the output pulses of the pulse generator 514, i.e., the writing clock pulses for the memory is denoted by $f_W$ and the clock frequency of the output pulses of the voltage/frequency converter, i.e., the reading clock pulses for the memory is denoted by $f_R$, the frequencies $f_W$ and $f_R$ are given the following relation:

$f_R = f_W/D$

In this manner, the short duration time transmitting signal $c_1$ written from the A/D converter 511 into the memory 512 is read out from the memory 512 while having the time axis converted according to the magnitude of the Doppler coefficient D, and it is taken out as a time axis conversion processed output signal $c_{10}$ through a D/A converter 513. The time of emergence of the signal $c_{10}$ is coincident with the time of emergence of the short duration time transmitting wave $c_5$. Thereafter, using the signal $c_{10}$ as the transmitting signal for the object recognition processing, this signal and the received wave $c_8$ with respect to the short duration time transmitting wave $c_5$ are supplied to the object characteristic pattern sampling and indicating part 900 shown in FIG. 3, and the signal processings described previously are conducted therein. Thus, an output signal $c_{11}$ is obtained.

The above embodiment is effective when applied in a case where the target object moves or a case where the relative positions of the target object and the transmitting and receiving transducers change. Of course, it is also applicable in a case where the target object is stationary.

I claim:

1. Object recognition system having:

a signal generator for generating a pulsed continuous wave signal, a transmitting transducer for converting a part of the output signal of the signal generator into a sonic or ultrasonic signal and for projecting the sonic or ultrasonic signal towards an object to be recognized, a receiving transducer for converting an echo signal reflected from the object into an electric signal, and a signal processing device for analyzing the output signal of the receiving transducer, characterized in that the signal processing device comprises:

(a) a first Fourier transform device for obtaining a Fourier transformed signal of the output signal of the signal generator, (b) a second Fourier transform device for obtaining a Fourier transformed signal of the output signal of the receiving transducer, (c) a circuit device for calculating the ratio of the above two Fourier transformed signals, and (d) a third Fourier transform device for obtaining an inverse Fourier transformed signal of the output signal of the circuit device.

2. Object recognition system according to claim 1, wherein said circuit device comprises an arithmetic circuit for calculating an inverse number of the output of said first Fourier transform device, and a multiplier for obtaining a product between the output of said arithmetic circuit and the output of said second Fourier transform device.

3. Object recognition system according to claim 1, wherein said signal processing device further comprises between said receiving transducer and said second Fourier transform device, a measurement circuit for measuring a Doppler shift from the output of said signal generator and the output of said receiving transducer, and a circuit for converting a time axis of the output of said receiving transducer on the basis of the output of said measurement circuit.

* * * * *